United States Patent Office 3,019,219
Patented Jan. 30, 1962

3,019,219
16,17-DISUBSTITUTED PROGESTERONES
Edward W. Cantrall, Pearl River, and Seymour Bernstein, New City, N.Y., assignors to American Cyanamid Company, New York, N.Y., a corporation of Maine
No Drawing. Filed July 14, 1960, Ser. No. 42,775
2 Claims. (Cl. 260—239.55)

This invention relates to substituted progesterones. More particularly, it relates to 16α-methyl-17α-lower alkanoyloxy-progesterones and derivatives thereof.

The new steroids of the present invention have the following general formula:

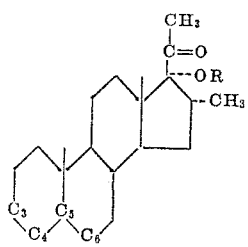

wherein R is a member of the group consisting of hydrogen and lower alkanoyl radicals, and

—C$_3$—C$_4$—C$_5$—C$_6$— is a member of the group consisting of:

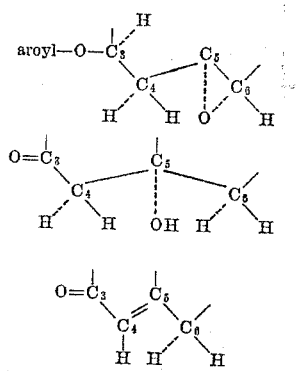

and

The compounds of the present invention are, in general, white crystalline high melting (above 175° C.) solids relatively insoluble in water but soluble in lower alkyl alcohols, acetone, ethyl acetate, tetrahydrofuran, benzene, toluene, methylene chloride and the like.

The process to prepare the compounds of the present invention uses as starting material, for example, 3β-hydroxy-16α-methyl-5-pregnen-20-one. The starting material is benzoylated by reaction with benzoyl chloride or benzoic anhydride in pyridine to produce 3β-benzoyloxy-16α-methyl-5-pregnen-20-one. This latter steroid is then reacted with a lower alkanoic acid anhydride, preferably acetic anhydride, to produce a 3β-benzoyloxy-20-lower alkanoyloxy-16α-methyl-5,17(20)-pregnadiene. Alternately, the starting material, 3β-hydroxy-16α-methyl-5-pregnen-20-one, can be reacted with a lower alkanoic acid anhydride, preferably acetic anhydride, to produce a 3β-20-dilower alkanoyloxy-16α-methyl-5,17(20)-pregnadiene.

The intermediate, 3β-benzoyloxy-20-lower alkanoyloxy-16α-methyl-5,17(20)-pregnadiene (IV) or 3β,20-dilower alkanoyloxy-16α-methyl-5,17(20)-pregnadiene (III), is then oxidized with perbenzoic acid, treated with alkali to rearrange the epoxy ester and treated with benzoyl chloride or acetic anhydride to insure that the 3-position is esterified. The alkaline treatment may de-esterify the 3-position thereby necessitating re-esterification as indicated.

When carrying out the reaction described immediately above, a mixture is obtained which can be separated by means of partition chromatography as shown in the examples. The desired fraction 6 consisting primarily of 3β-benzoyloxy-5α,6α-epoxy-17α-hydroxy-16α-methyl pregnan-20-one (V). The latter compound is treated with a reducing agent such as lithium aluminum hydride to produce 3β,5α,17α,20β-tetrahydroxy-16α-methylpregnane (VI). The latter compound is converted into 5α, 17α-dihydroxy-16α-methylpregnane-3,20-dione (VII) by treatment with an oxidizing agent, for example, such as N-bromosuccinimide, N-bromophthalimide, N-bromoacetamide and the like followed by treatment with acid or alkali to strip the elements of water creating the 4,5-double bond. The resulting 17α-hydroxy-16α-methyl-4-pregnene-3,20-dione (VIII) may be acylated by the use of lower alkanoic acid chlorides or anhydrides. The reactions described above can be graphically illustrated by the following flowsheet which shows the specific reactions.

FLOWSHEET

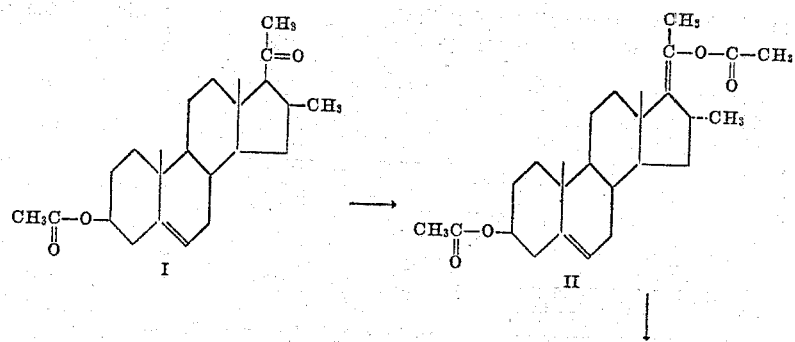

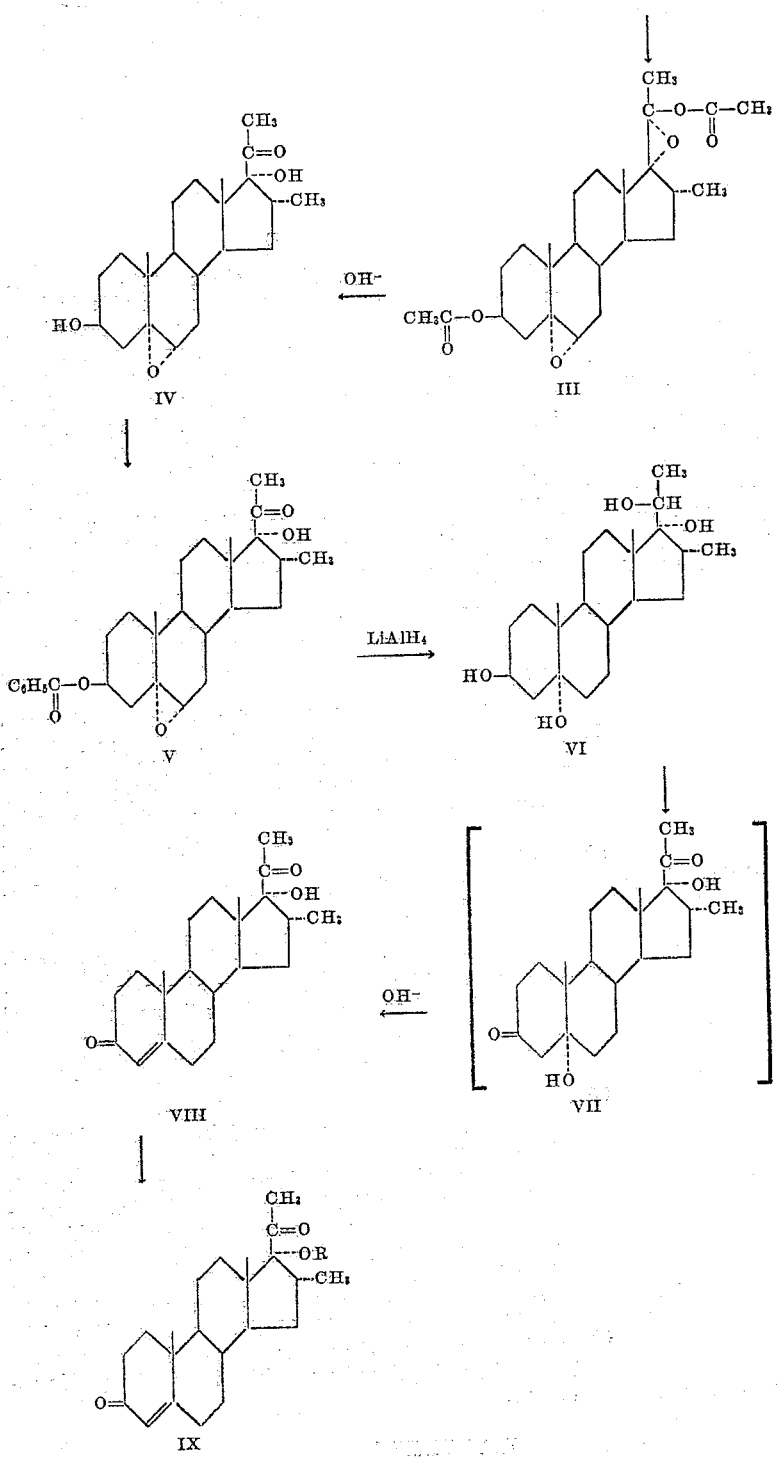

in which R is a lower alkanoyl radical.

Compounds such as 17α-acetoxy-16α-methyl progesterones have been found to have progestational activity. Compounds of this activiy are useful in various disorders such as, for example, habitual abortion, menopausal syndrome and infertility. Steroids having progestational activity have also been employed in prostatic carcinoma, acne vulgaris and senility. These compounds can be dispensed in the usual pharmaceutical forms such as tablets, capsules, pills and the like. Obviously, they can be combined with fillers, diluents, excipients and other non-therapeutic compounds necessary to the formulation of the pharmaceutical product.

The following examples illustrate in detail the preparation of the substituted progesterones of the present invention.

*Example I*

PREPARATION OF 3β-BENZOYLOXY-5α,6α-EPOXY-17α-HYDROXY-16α-METHYLPREGNAN-20-ONE

A solution containing 100 g. of 3β-acetoxy-16α-methyl-5-pregnen-20-one and 51 g. of p-toluenesulfonic acid (monohydrate) in 3 liters of acetic anhydride is heated to reflux for 5 hours, during which time 2.5 liters of solution is distilled. The dark solution is cooled to 0° C. diluted with 500 ml. of ether and washed successively with ice-cold 5% sodium hydroxide and saturated sodium chloride solutions. The mixture is dried overnight over 100 g. of anhydrous sodium sulfate, decanted from the drying agent, and evaporated under reduced pressure to a black viscous mass. The latter is dissolved in 300 ml. of benzene and diluted with 4 liters of petroleum ether. The solution is filtered through 1000 g. of activated magnesium silicate and the column is washed with 4.2 liters of petroleum ether:benzene (20:1) and 4 liters of benzene. The combined eluate on evaporation gives 72.9 g. of the crude product, $3\beta,20$-diacetoxy-$16\alpha$-methyl-5,17(20)-pregnadiene (II), a viscous orange oil whose infrared spectrum in carbon tetrachloride shows the presence of only trace amounts of unreacted C-20 ketone.

To a stirring solution of the crude enolacetate obtained above (72.9 grams) in 1 liter of methylene chloride at $-5°$ C. is added 1105 ml. of a 0.35 M solution of perbenzoic acid in benzene dropwise over 25 minutes. The resulting mixture is allowed to stand at $-5°$ C. for 23 hours to give $3\beta,20$-diacetoxy-$5\alpha,6\alpha;17\alpha,20$-diepoxy-$16\alpha$-methylpregnane (III). The mixture is diluted with 1.5 liters of ether and is washed successively with 5% sodium hydroxide, water and saturated sodium chloride solutions. The extract is concentrated to a viscous amber oil which is dissolved in 600 ml. of hot ethanol and cooled to room temperature and 2400 ml. of 5% aqueous-ethanolic potassium hydroxide solution (150 g. sodium hydroxide, 300 ml. of water and 2700 ml. absolute ethanol) is added. The resulting solution is allowed to stand at room temperature for one hour and is then neutralized with 160 ml. of glacial acetic acid. The reaction mixture is concentrated to a solid mass under reduced pressure and partitioned between water and 1.5–2.0 liters of ether-methylene chloride (2:1). The extract is washed repeatedly with 5% sodium hydroxide, water and saturated sodium chloride solution and is concentrated to a semi-crystalline mass under reduced pressure which contains $5\alpha,6\alpha$-epoxy-$3\beta,17\alpha$-dihydroxy-$16\alpha$-methylpregnan-20-one (IV). To a solution of the latter in 350 ml. of pyridine is added 27.9 g. of benzoyl chloride. The reaction mixture is allowed to stand 80 hours at room temperature following which 50 ml. of water is added and the resulting mixture is stirred at room temperature for three hours. The mixture is then diluted with 3 liters of water and the amorphous precipitates which formed is filtered and then dissolved in 2.5 liters of benzene-methylene chloride (ca 4:1). The extract is worked up in the usual way to give a yellow semi-crystalline solid which is dried overnight under reduced pressure at 75° C. to give 69.9 grams. A portion of the crude mixture (15.0 grams) is partitioned over diatomaceous earth with n-heptane-methylcellosolve to give the following results.

Frac. No.:
1—Very small amount of oil
2—Very small amount of oil
3—Very small amount of oil
4—1.20 g. of colorless granules
5—0.58 g. of an amber gum
6—2.37 g. of colorless crystals
7—2.68 g. of semi-crystalline solid
8—0.90 g. of a semi-crystalline solid
9—4.82 g. of colorless semi-crystalline solid Methanol wash of column—0.85 g. of a brown oily solid $3\beta$-Benzoyloxy-$5\alpha,6\alpha$-epoxy-$17\alpha$-hydroxy-$16\alpha$-methylpregnan-20-one (V) is contained in Fraction No. 6. An analytically pure sample melts at 247.5°–248.5° C.

*Example II*

PREPARATION OF $3\beta,5\alpha,17\alpha,20\beta$-TETRAHYDROXY-$16\alpha$-METHYLPREGNANE A mixture containing 1.00 grams of $3\beta$-benzoyloxy-$5\alpha,6\alpha$-epoxy-$17\alpha$-hydroxy-$16\alpha$-methylpregnan-20-one (prepared in Example I) and 0.830 grams of lithium aluminum hydride in 100 ml. of tetrahydrofuran (freshly distilled off lithium aluminum hydride) is heated to reflux for 17 hours. The mixture is cooled to room temperature, and the excess hydride is decomposed via the dropwise addition of water with cooling. The reaction mixture is partitioned between 15% sulfuric acid and ethyl acetate-benzene (1:1). The organic phase is washed successively with 5% potassium hydroxide, water and saturated sodium chloride solutions, and on concentration gives a crystalline mass which crystallized from ethyl acetate to give 0.504 grams (64% of theoretical yield) of $3\beta,5\alpha,17\alpha,20\beta$-tetrahydroxy-$16\alpha$-methylpregnane (VI) as colorless prisms, melting point 216.5–222.5° C. An analytically pure sample has a melting point of 216–219.5° C.

*Example III*

PREPARATION OF $17\alpha$-HYDROXY-$16\alpha$-METHYL-PROGESTERONE

To a solution containing 830 mg. of $3\beta,5\alpha,17\alpha,20\beta$-tetrahydroxy-$16\alpha$-methylpregnane (VI) in 85 ml. of acetone is added 25 ml. of water and 1.57 grams of N-bromoacetamide. After the reaction has stood for 17 hours at room temperature, it is diluted with 300 ml. of water and extracted repeatedly with ether. The ether extract is washed with water and saturated sodium chloride solution and is evaporated to a semi-crystalline solid containing $5\alpha,17\alpha$-dihydroxy-$16\alpha$-methylpregnane-3,20-dione (VII) which is taken up in 60 ml. of methanol and heated to reflux with 6 ml. of a 5% aqueous potassium hydroxide for one hour under nitrogen. The reaction mixture is neutralized with acetic acid and evaporated to an amber gum which is taken up in a few ml. of methylene chloride and placed on a 40 gram column of activated magnesium silicate. The product, $17\alpha$-hydroxy-$16\alpha$-methylprogesterone (VIII), is eluted with 5% acetone-petroleum ether and crystallized from the same solvents to give 263 mg. (34% of theoretical) of colorless prisms, melting point 178–182.5° C. A sample recrystallized several times from the above solvents has a melting point of 180–183.5°; $[\alpha]_D^{25} = +85.7°$.

*Example IV*

PREPARATION OF $17\alpha$-ACETOXY-$16\alpha$-METHYL-PROGESTERONE

To a solution containing 113 mg. of $17\alpha$-hydroxy-$16\alpha$-methylprogesterone (VIII) in 5.0 ml. of glacial acetic acid is added 111 mg. of p-toluenesulfonic acid (monohydrate) and 1.0 ml. of acetic anhydride. The mixture is allowed to stand for 60 hours at room temperature after which it is diluted with 100 ml. of water and the product is extracted into ether. The ether extract after washing with water and saturated sodium chloride solution is evaporated to an amber oil. The latter is taken up in a mixture composed of 20 ml. of methanol and 3.3 ml. of tetrahydrofuran. The resulting solution is cooled to 0° and 6.7 ml. of an ice cold solution of 2% potassium hydroxide in methanol is added. After an hour at 0°, the mixture is neutralized with dilute hydrochloric acid and evaporated under reduced pressure to an amber gum. The product containing $17\alpha$-acetoxy-$16\alpha$-methylprogesterone (IX) is extracted into methylene chloride and the extract is dried over anhydrous sodium sulfate and concentrated to a small volume. The dried extract is placed on a small column of activated magnesium silicate (8 mm. x 22 cm.; 60/100 mesh.), and the product is eluted with 3% acetone-petroleum ether. Crystallization from acetone-petroleum ether gives 37 mg. of colorless needle clusters, melting point 210–231° C. A sample recrystallized several times from the same solvents gives pure $17\alpha$-acetoxy-$16\alpha$-methylprogesterone (IX) with a melting point of 231–236° C. (Kofler block).

In another experiment, 110 mg. of $17\alpha$-hydroxy-$16\alpha$- methylprogesterone (VIII) is acetylated for 16 hours to give 39 mg. of the acetate (IX), melting point 229–234° C. (Kofler block).

We claim:
1. The compound 3β-benzoyloxy-5α,6α-epoxy-17α-hydroxy-16α-methylpregnan-20-one.
2. The compound 5α,17α-dihydroxy-16α-methylpregnane-3,20-dione.

References Cited in the file of this patent
UNITED STATES PATENTS
2,878,247     Miramontes et al. _____ Mar. 17, 1959

OTHER REFERENCES
Turner, J.A.C.S. 75 (1953), pages 3489–92.
Fieser et al.: Steroids, 1959, pages 200, 224 and 779. Reinhold Pub. Co., New York.